United States Patent [19]

Piper

[11] Patent Number: 4,655,499
[45] Date of Patent: Apr. 7, 1987

[54] DOOR HINGE FOR VEHICLE

[76] Inventor: Robert J. Piper, 22494 Ray, Detroit, Mich. 48223

[21] Appl. No.: 704,483

[22] Filed: Feb. 22, 1985

[51] Int. Cl.⁴ .................. B60J 5/00; E05D 15/28; E05D 11/10; E05D 3/08
[52] U.S. Cl. .................. 296/146; 49/192; 49/246; 16/232; 16/324; 16/366
[58] Field of Search .................. 296/76, 51, 56, 106, 296/146; 16/302, 366, 324, 333, 374, 375, 388, DIG. 17, 231, 232, 371; 49/192, 246

[56] References Cited

U.S. PATENT DOCUMENTS

| 378,861 | 3/1888 | Atwood | 16/366 |
|---|---|---|---|
| 401,086 | 4/1889 | Turner | 16/366 |
| 1,689,664 | 10/1928 | Covell | 16/371 |
| 2,138,523 | 11/1938 | Haberstump | 296/146 |
| 2,142,319 | 1/1939 | Leonard | 16/302 |
| 2,372,431 | 3/1945 | Kahle | 16/371 |
| 2,825,301 | 3/1958 | Quist | 296/24 C |
| 3,195,945 | 7/1965 | Barenyi | 16/366 |
| 3,336,075 | 8/1967 | Wilson | 296/146 |
| 3,469,277 | 9/1969 | Henrichs et al. | 16/324 |
| 3,558,184 | 1/1971 | Plegat | 296/146 |
| 3,600,742 | 8/1971 | Barger | 16/366 |
| 3,619,853 | 11/1971 | Merrill | 16/366 |
| 3,909,877 | 10/1975 | Christy et al. | 16/DIG. 17 |
| 4,186,460 | 2/1980 | Artman | 16/374 |
| 4,437,529 | 3/1984 | Fralish | 16/374 |
| 4,486,919 | 12/1984 | Schoenke | 16/366 |

FOREIGN PATENT DOCUMENTS

| 211355 | 4/1956 | Australia | 16/324 |
|---|---|---|---|
| 2811739 | 9/1979 | Fed. Rep. of Germany | 16/371 |

Primary Examiner—Robert B. Reeves
Assistant Examiner—Dennis H. Pedder
Attorney, Agent, or Firm—Reising, Ethington, Barnard, Perry & Milton

[57] ABSTRACT

A vehicle including a door (16) and door frame (14). A hinge mechanism connects the door (16) to the door frame (14), the hinge mechanism including a bracket member (22) having first and second ends (24, 26) and a first support bracket (28) for supporting the first end (24) from a door frame (14) by a pin member (30) and a second support bracket (32) for supporting the second end (26) from a door (16) by a second pin member (34). The invention is characterized by including a hinge latching mechanism (48) for releasably latching one of the first and second ends (24, 26) of the bracket member (22) from pivoting movement relative to the respective one of the first and second support brackets (28, 32).

38 Claims, 14 Drawing Figures

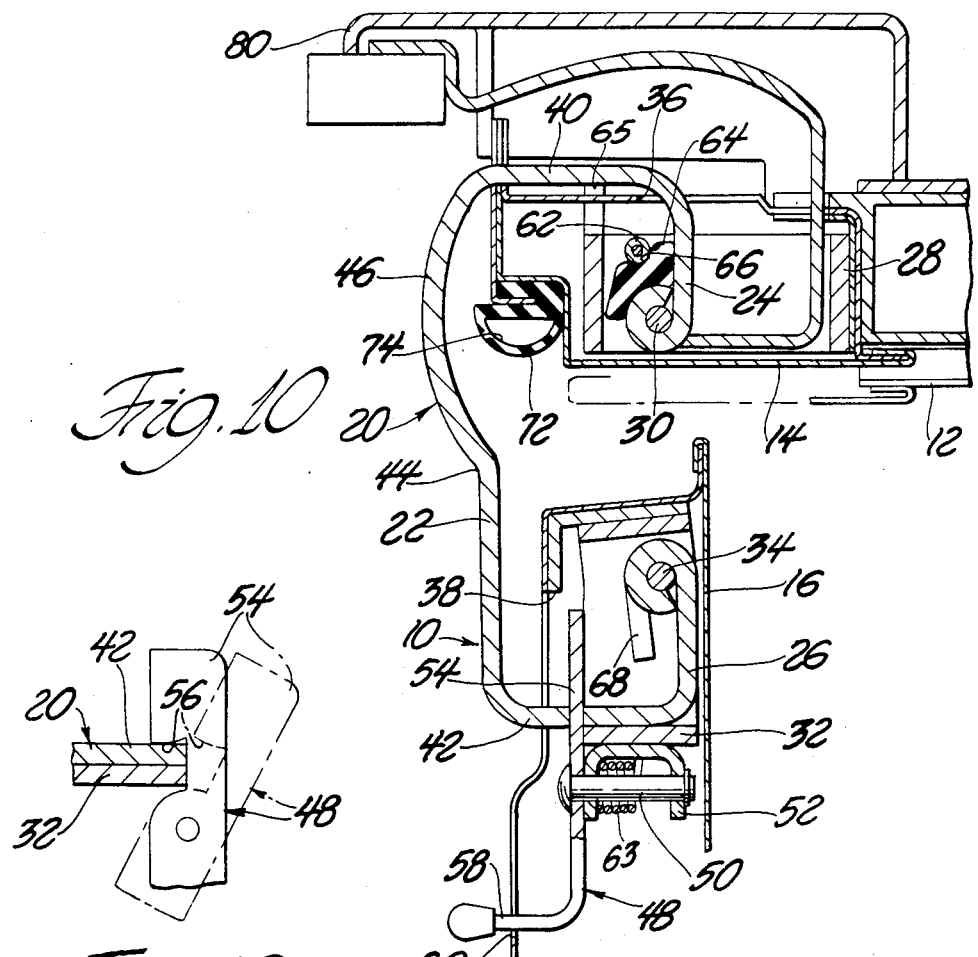
Fig. 10
Fig. 12
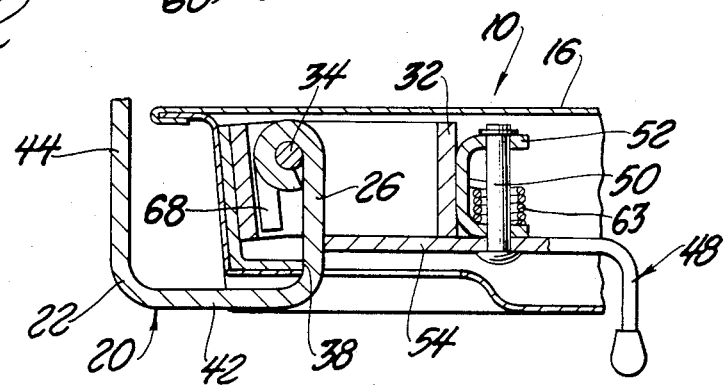
Fig. 11

DOOR HINGE FOR VEHICLE

TECHNICAL FIELD

The subject invention is directed to a door hinge assembly which is designed to be used in an automotive application, such as on a van or motor home.

BACKGROUND ART

There are a multiplicity of door hinge constructions utilized for connecting a pivoting door to a stationary wall structure of an automobile or a van. In a vehicle such as a van, it is advantageous to be able to move the door assembly completely out of the path of the doorway opening. For example, the U.S. Pat. No. 3,195,945 to Barenyi, issued July 20, 1965, discloses a door hinge assembly for effectively moving a door away from the doorway opening. In this assembly, the hinge is constructed so as to outwardly move the door and then effectively slide the door sideways and away from the doorway opening.

Other assemblies have used double-hinge constructions for pivoting a door 180° so as to swing the door completely away from the doorway opening. The U.S. Pat. No. 2,372,431 to Kahle, issued Mar. 27, 1945, dislcoses such a hinge assembly. The Kahle patent discloses a hidden door hinge including a primary and secondary hinge pin. The door hinge often includes a U-shaped member which is in rotating relationship with the primary and secondary hinge pins, respectively. A hinge control extending throughout the full length of the door is disposed closely about the hinge member. The door wall is rotatably attached via loops which are aligned with the loop of the hinge member. The assembly includes stops for limiting further pivotal movement of the door when moved 180° from its fully closed position. Double-door hinges have also been shown in other environments. For example, U.S. Pat. Nos. 378,861 to Atwood, issued Mar. 6, 1888; 401,086 to Turner, issued Apr. 9, 1889; and 1,689,664 to Covell, issued Oct. 30, 1928, al disclose dual-pin hinge assemblies.

In the particular environment of an automobile or van, it is preferable to have a dual-stop hinge wherein the door may be opened 90° relative to the doorway opening to allow exit and entrance of passengers and, further, to open the door 180° to allow for entrance and exit of cargo. No prior art patent discloses means for achieving the result of effectively opening the door to a 90° stop and then selective opening of the door to a 180° stop.

Additionally, automotive vehicles such as vans have outwardly curved side panels and doors in the side panels for entrance and exit of passengers and cargo. Presently, to provide an effective hinge for the door wherein the hinge is placed along the curved side panel, it is necessary that the hinge extend outwardly from the panel so as to provide sufficient clearance for the door as it opens. These hinges are aesthetically unsightly as they take away from the lines of the side panels of the vans. Further, they provide unwanted projections extending outwardly from the doors. The instant invention provides a hidden hinge disposed entirely within the door panels which also provide for sufficient clearance to allow incremental and a total 180° opening of the door.

STATEMENT OF INVENTION AND ADVANTAGES

The subject invention provides a door hinge including a bracket having first and second ends. A first support means supports the first end from a door, the first support means including first connecting means for connecting the first end of the bracket for pivoting movement relative to the first support means, and second support means for supporting the second end from a stationary wall. The second support means includes second connecting means for connecting the second end of the bracket for pivoting movement relative to the second support means. The instant invention is characterized by including hinge latching means for reversibly latching one of the first and second ends of the bracket member from pivoting movement relative to the respective one of the first and second support means.

The instant invention provides a door hinge assembly of the dual-pin type which effectively locks the rotation about one of the hinges selectively to open the door 90° and allowing for unlocking of the other door hinge to allow continued rotation of the door to 180° relative to the door wall support.

FIGURES IN THE DRAWINGS

Other advantages of the present invention will be readily appreciated as the same becomes better understood by reference to the following detailed description when considered in connection with the accompanying drawings wherein:

FIG. 10 is a cross-sectional view of the subject door hinge in the 90° open position;

FIG. 11 is a cross-sectional view of the second support means of the instant invention shown in the 180° open position;

FIG. 12 is an enlarged cross-sectional view of the locking means in the locked position in full lines and in the unlocked position in phantom;

DETAILED DESCRIPTION OF THE DRAWINGS

Figure 1:
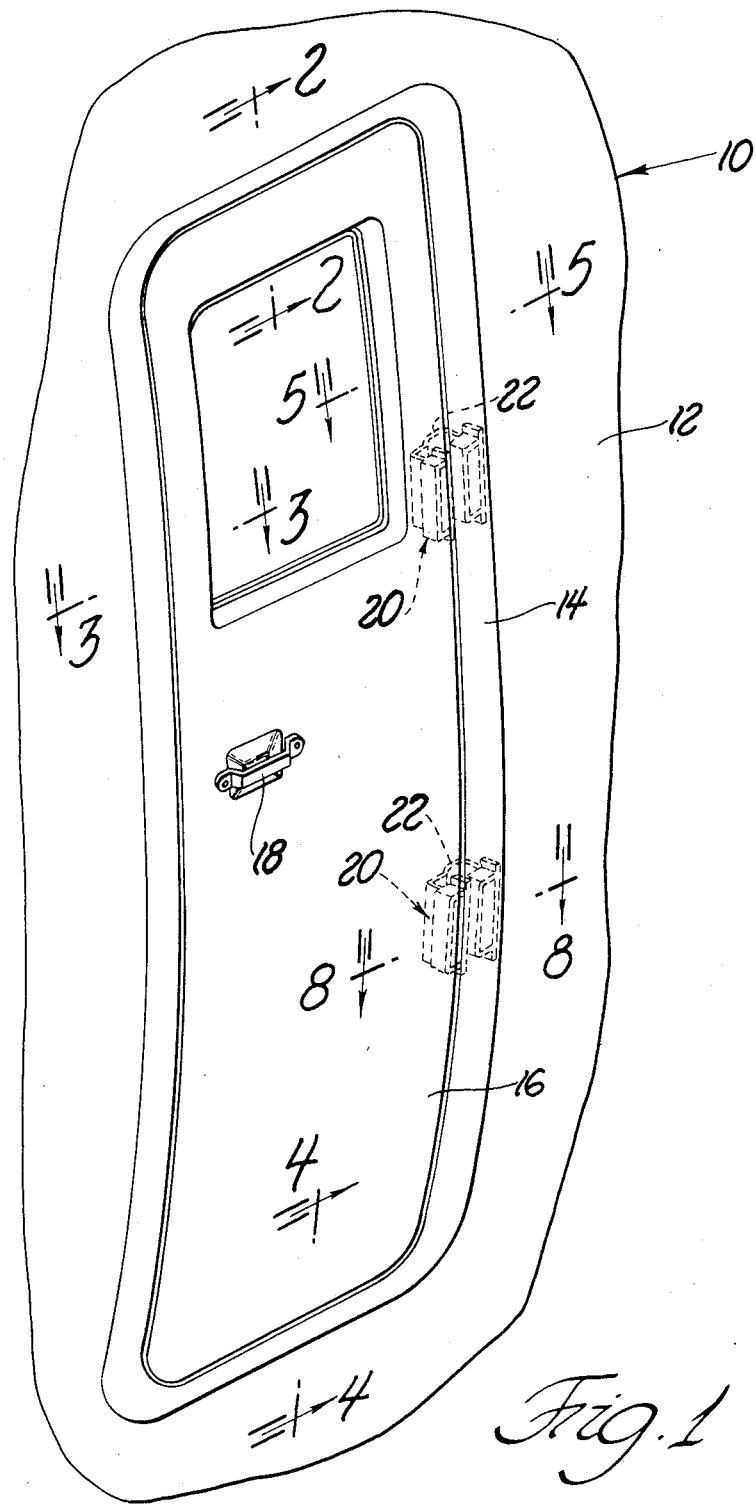
FIG. 1 is a fragmentary, perspective view of the instant invention connecting a door to a door wall.
Figure 2:
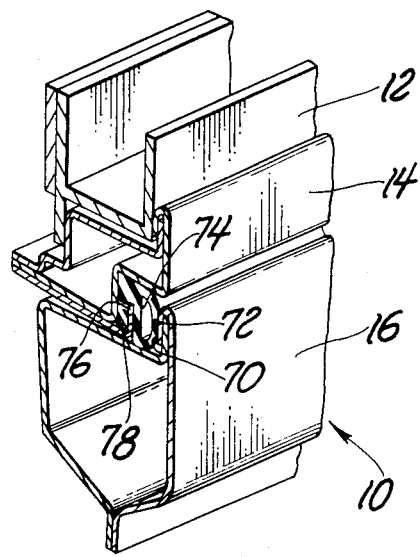
FIG. 2 is a fragmentary, perspective cross-sectional view taken substantially along lines 2—2 of FIG. 1.
Figure 3:
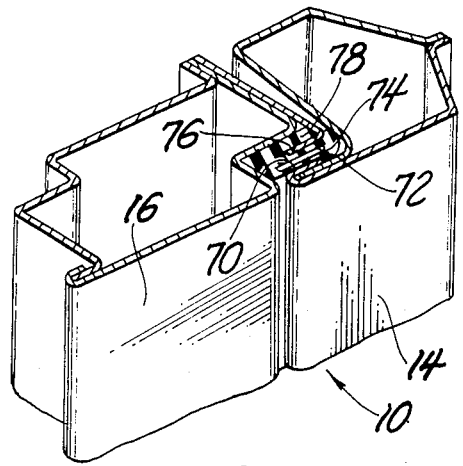
FIG. 3 is a fragmentary, perspective cross-sectional view taken substantially along lines 3—3 of FIG. 1.
Figure 4:
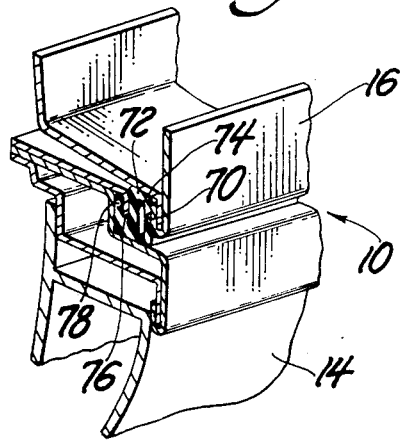
FIG. 4 is a fragmentary, perspective cross-sectional view taken substantially along lines 4—4 of FIG. 1.
Figure 5:
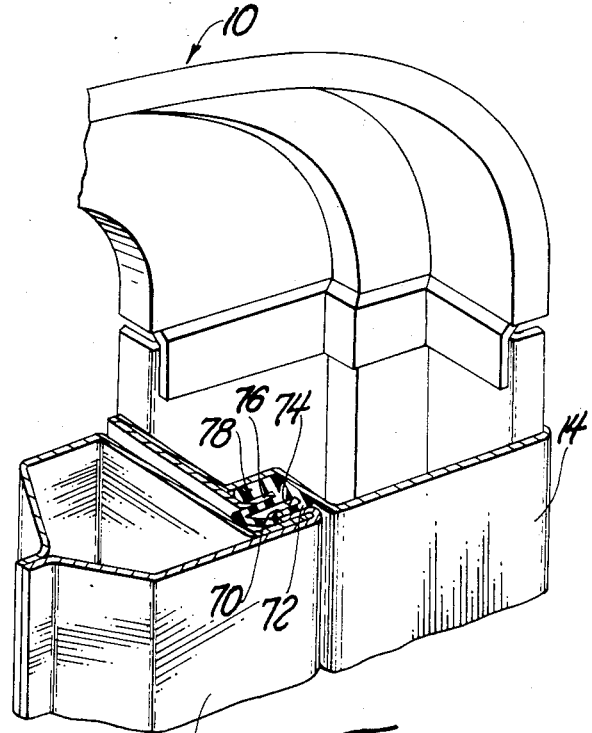
FIG. 5 is a fragmentary, perspective cross-sectional view taken substantially along lines 5—5 of FIG. 1.

A vehicle comprising the instant invention is generally shown at 10 in the Figures. As shown in FIG. 1, the vehicle includes a side wall panel 12 and a door frame 14 supported therein. A door 16 including a conventional handle 18 is connected to the door frame 14 by means of hinges generally shown at 20. The handle 18 operates a door locking mechanism which releasably fixes the door 16 relative to the door frame 14. The hinge means 20 connects the door 16 to the door frame 14 for swinging movement of the door relative to the door frame for a 180° turn. The door 16, door frame 14 and body 12 are outwardly curved.

The door hinge 20 includes a bracket member 22 having a first end portion 24 and a second end portion 26. The door hinge 20 includes first support means comprising bracket member 28 for supporting the first end 24 of the bracket 22 from the door frame 14. The first support means 28 includes first connecting means comprising pin member 30 for connecting the first end 24 of the bracket member 22 for pivoting movement relative to the first support means 28. The door hinge 20 further includes second support means comprising bracket member 32 for supporting the second end 26 of the bracket member 22 from the door 16. The second support means 32 includes second connecting means comprising a second pin 34 for connecting the second end 26 of the bracket member 22 for pivoting movement relative to the second support means 32. The invention is characterized by including hinge latching means 48 for releasably or reversibly latching one of the first and second ends 24, 26 of the bracket member 22 from pivoting movement relative to the respective one of the first and second support means 28, 32. In other words, the hinge latching means 48 may releasably latch one of the first or second ends 24, 26 of the bracket member 22 relative to the respective adjacent one of the support means 28, 32.

Figure 7:
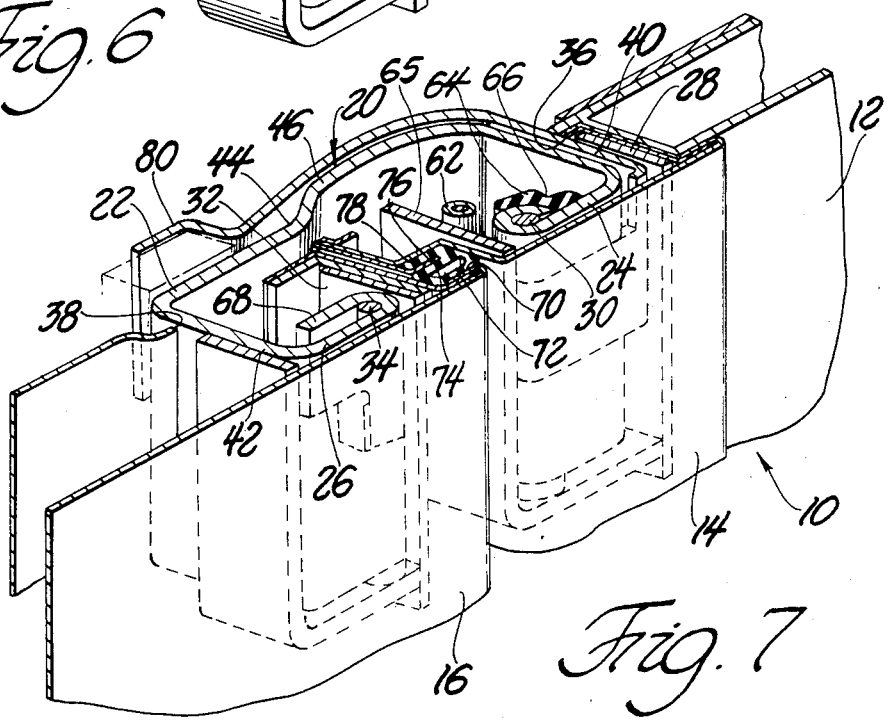
FIG. 7 is a fragmentary, perspective cross-sectional view of the instant invention.
Figure 8:
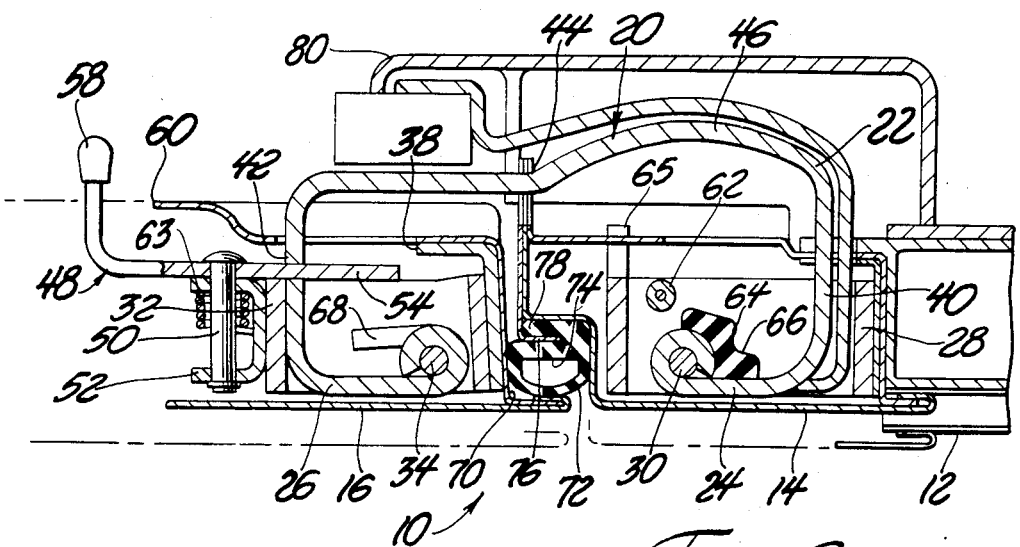
FIG. 8 is a cross-sectional view taken substantially along lines 8—8 of FIG. 1.

More specifically, the first support means 28 is mounted within the door frame 14 and the second support means 32 is mounted within the door 16. The door frame 14 includes an opening 36 within the vehicle 10 and the door 16 includes an opening 38 within the vehicle 10. The bracket member 22 is substantially C-shaped and includes a first leg 40 extending through the opening 36 in the door frame 14 and a second leg 42 extending through the opening 38 in the door 16 and an intermediate portion 44 extending between the first and second leg portions 40, 42 whereby the hinge means 20 is disposed completely within the vehicle 10. The instant invention does not protrude outside the vehicle when the door is in the closed position as shown in FIG. 1. In other words, the hinge means 20 of the instant invention is completely hidden from view from outside the vehicle 10 when the door 16 is in the closed position. Moreover, the bracket member 22 completely covers the openings 36 and 38 from view from inside the vehicle. Said another way, the first and second pivotal connecting means 30, 34 lie in a plane substantially parallel to an exterior face of the door 16 when the door 16 is in the closed position as illustrated in FIGS. 1, 7 and 8.

The intermediate portion 44 of the bracket member 22 includes an outwardly curved portion 46 adjacent to the first leg 40. The curved portion 46 provides clearance of the bracket member 22 as the door 16 is moved to the open position as discussed below.

The hinge latching means includes a latch member generally indicated at 48 mounted on the second support means 32 by a pin member 50. The pin member 50 is mounted on a bracket member 52, the bracket member 52 being fixedly secured to the second support means 32. The latch member 48 has a locked condition as shown in solid lines in FIGS. 9, 12 and 13 wherein the latch member 48 engages the second leg 42 of the bracket member 22 to prevent pivoting movement of the bracket member 22 relative to the second support means 32. The latch member 48 has an unlocked condition as shown in phantom in FIGS. 9, 12 and 13 wherein the latch member 22 is disengaged from the second leg 42. As shown in FIG. 12, the latch member 48 includes a leg portion 54 having a notch 56 therein, the leg portion 54 pivoting to engage the notch 56 on the second leg 42 in the locked condition and to release the notch 56 from the second leg 40 in the unlocked condition. In the locked condition the door 16 is fixed relative to the bracket member 20. As the door 16 is released from the body portion 12, the bracket member 22 pivots about the pin 30. Upon release of the latch member 48, the door 16 is able to pivot about the pin member 34 thereby moving the door 16 relative to the bracket member 22. The curved portion 46 of the bracket member 22 allows for clearance around the door frame 14 as the door pivots around the pin member 30.

The latch member 48 is L-shaped and has the leg portion 54 at one end and a handle 58 at the other end thereof. The handle 58 extends through an opening 60 in the door 16 to allow for access to the handle 58.

Figure 6:
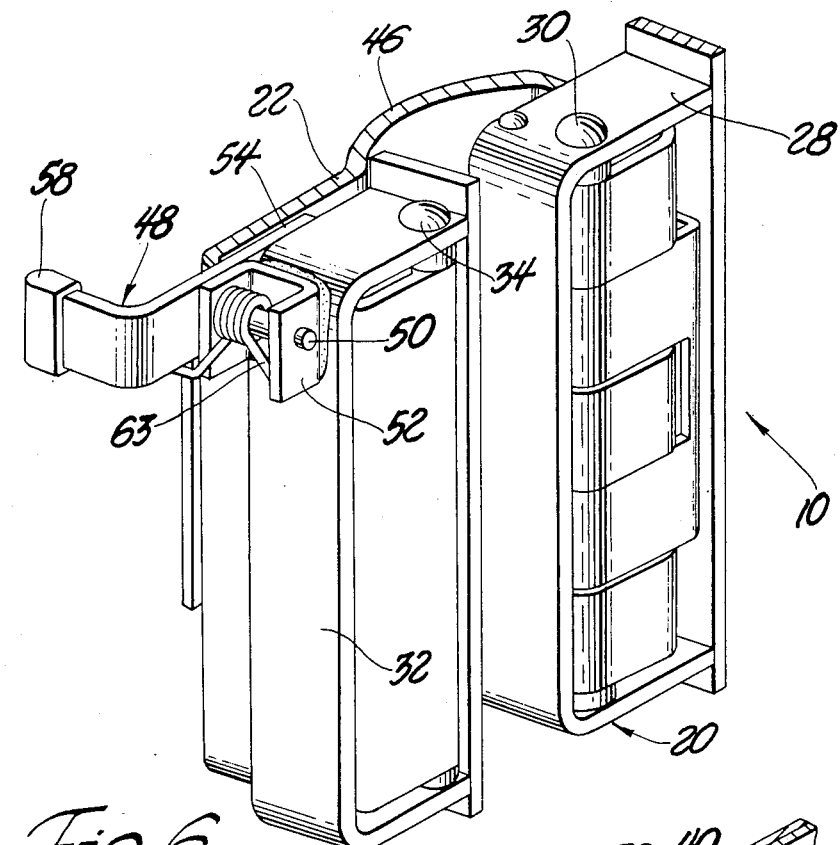
FIG. 6 is a fragmentary, perspective view of the instant invention.

The latching means further includes biasing means for biasing the latch member 48 toward the locked condition. As shown in FIG. 6, a wound spring 63 is used to bias the latch member 48 toward the locked condition.

Figure 9:
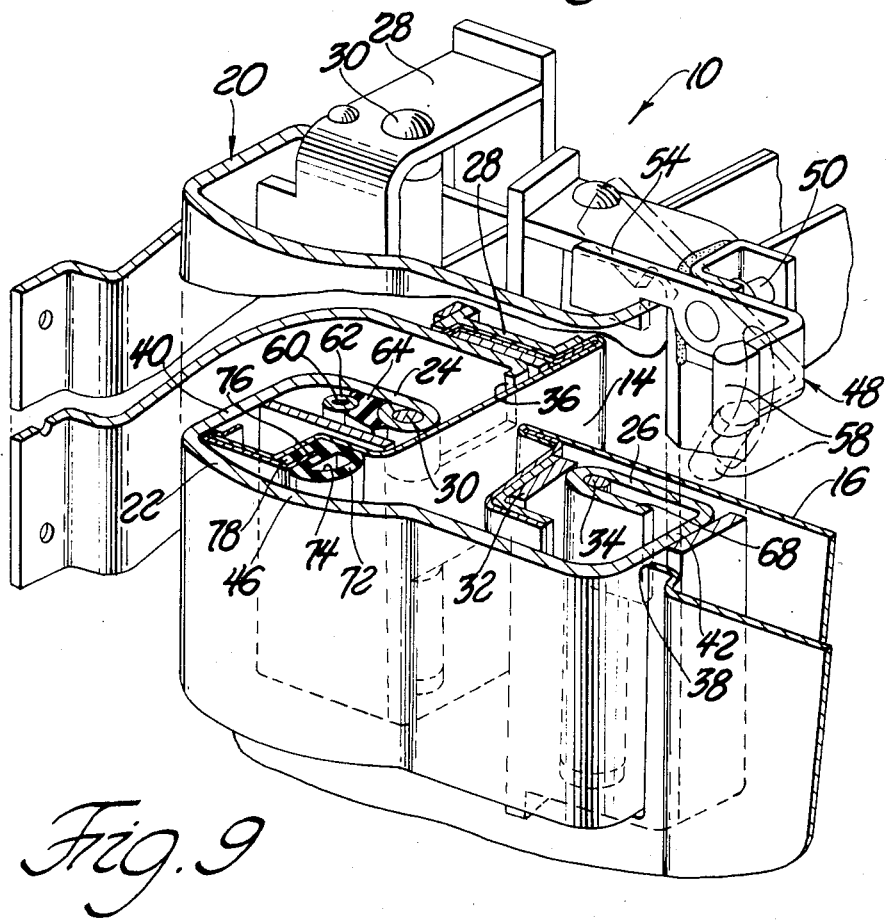
FIG. 9 is a fragmentary, perspective view partially broken away of the subject door hinge opened 90°.

The first and second ends 24, 26 of the bracket member 22 are substantially C-shaped and disposed about the pin members 30, 34, respectively, in sliding pivotal engagement therewith. The hinge assembly 20 includes 90° pivot restraint means for restraining pivoting movement of the bracket member 22 as it is pivoted 90° about the first pivot axis defined by the first pin 30 relative to the first support means 28. The 90° restraint means includes a check pin 62 mounted on the first support means 28 in spaced parallel relationship to the first pin member 30. The 90° pivot restraint means further includes a detent member 64 mounted on the first end 24 of the bracket member 22. The detent 64 includes a shoulder 66 which engages the check pin 62 when the bracket member 22 pivots 90° about the first pin member 30 relative to the first support means 28 as shown in FIGS. 9 and 10. The pin 62 may be a spring pin having a rubber sleeve thereover. The shoulder or cammed surface 66 of the detent 64 deforms the spring pin 62 prior to seating of the spring pin 62 in the shoulder 66. The sleeve around the pin 62 promotes free movement of the detent member 64 against the pin 62, alleviating any noise due to frictional contact between the members.

The assembly 10 further includes 90° pivot stop means for stopping pivoting movement of the bracket member 22 at 90° about the first pivot axis relative to the first support means 28. The 90° pivot stop means includes an extended end portion 65 of the first support means 28 which abuts against the first leg 40 of the bracket member 22 when the bracket member 22 is pivoted 90°, as shown in FIGS. 9 and 10.

Figure 13:
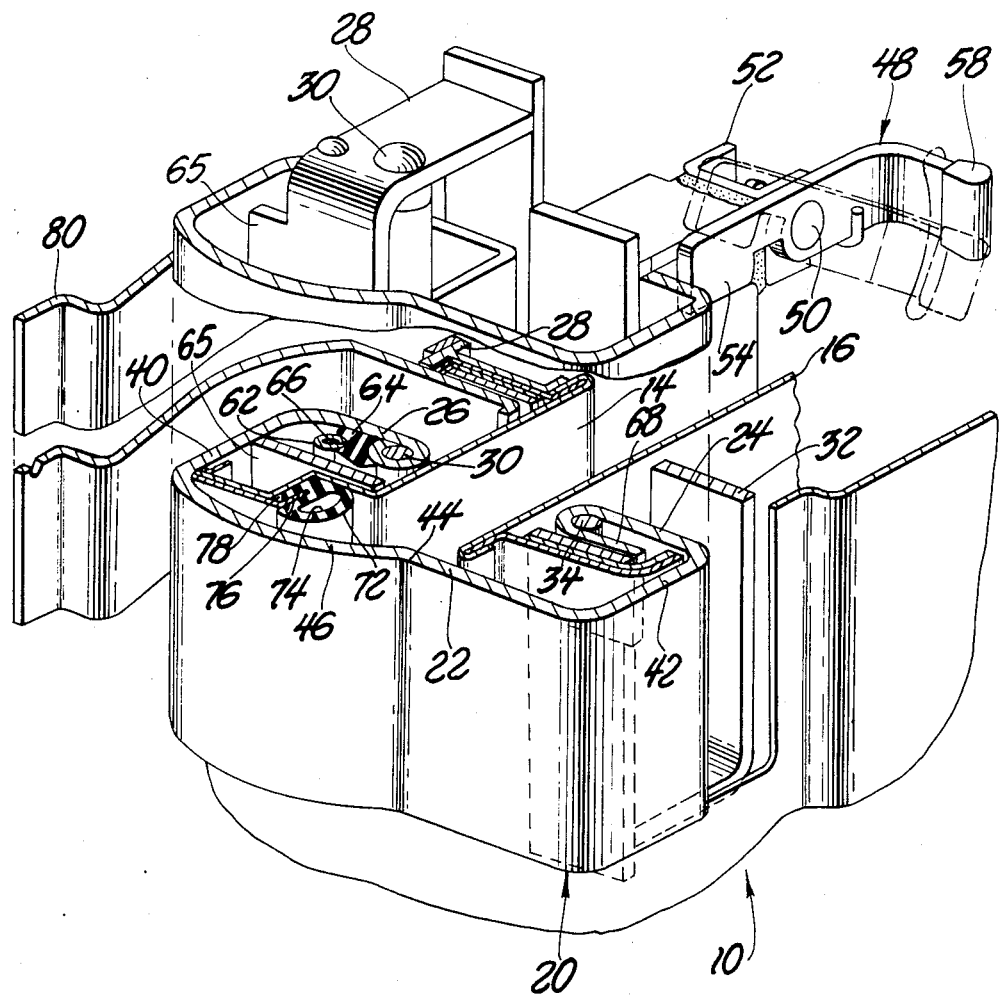
FIG. 13 is a fragmentary, perspective view partially broken away and in cross section of the subject door hinge open to the 180° open condition.

The assembly further includes 180° pivot stop means for stopping pivoting movement of the second support means 32 as it is pivoted 90° about the second pivot axis defined by the second pin member 34 relative to the bracket member 22. In this manner, the 180° pivot stop means provides a stop when the door 16 is effectively pivoted 180° relative to its closed position, as shown in FIGS. 11 and 13. The 180° pivot stop means includes a stop plate 68 extending from the C-shaped second end 26 of the bracket member 22 tangentially relative to the second pivot axis defined by the second pin member 34. The stop plate 68 engages the second support means 32 when the second support means 32 pivots 90° relative to the bracket member 22 as shown in FIGS. 11 and 13. Thus, the instant invention provides a first stop means comprising the detent member 64 and pin 62 which stop the door movement as it is opened 90° and a second stop member comprising the stop plate 68 which stops the door movement at 180°.

Figure 14:
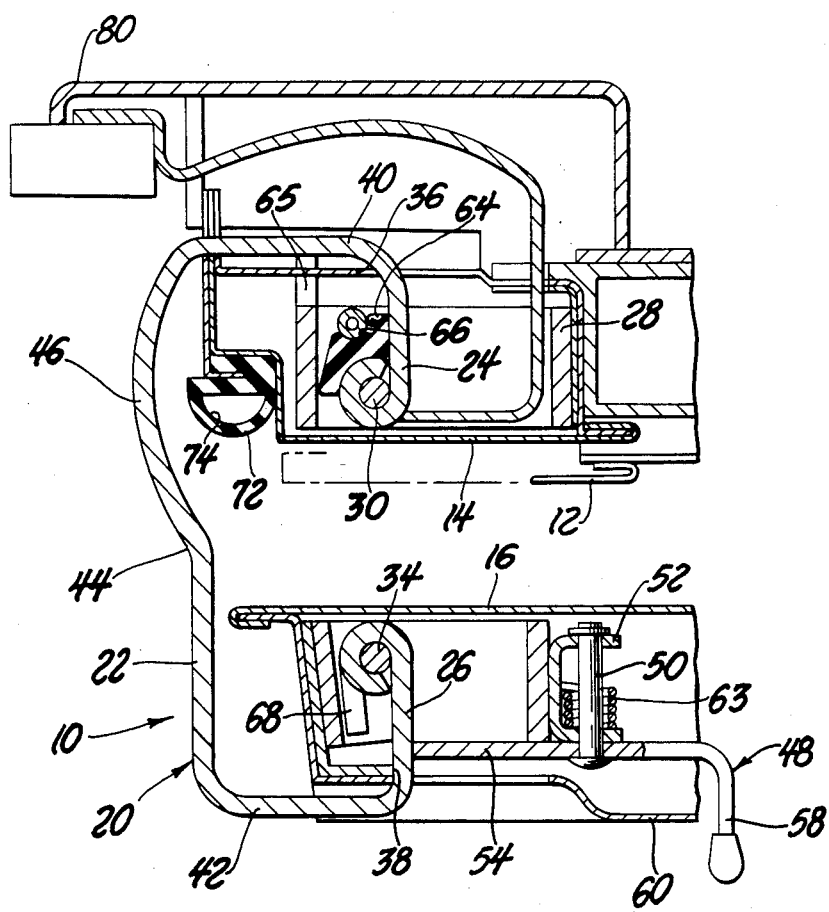
FIG. 14 is a cross-sectional view of the subject door hinge in the 180° open position.

The assembly 10 includes 180° locking means for locking pivoting movement of the second support means 32 at 90° about the second pivot axis relative to the bracket member 22. The 180° locking means includes an end portion of the latch member 48 which engages an outer surface of the second end 26 of the bracket member 22 when the door 16 is completely open, as shown in FIGS. 11, 13, and 14. The biasing spring 63 biases the latch member 48 downwardly into the locking position. The latch member 48 may be pivoted to raise the end portion of the latch member 48 to release the door 16 from the locked condition.

The door frame 14 defines a first housing for enclosing the first support means 28 and the first end 24 of the bracket member 22. The door 16 defines a second housing for enclosing the second support means 32 and the second end 26 of the bracket member 22. The assembly includes seal means for perfecting a seal between the door frame 14 and door 16 when the door is in the closed position as shown in FIGS. 1 through 5, 7 and 8. The meeting walls of the door frame 14 and door 16 define a pocket 70 therebetween when the door is in the closed position. The seal means is disposed within the pocket 70. The seal means comprises essentially a flexible tubular member 72 having a hollow longitudinal center portion 74. The hollow longitudinal center portion 74 collapses as the door 16 is brought into the closed position adjacent the door frame 14 thereby perfecting a seal within the pocket 70. The door frame 14 includes a flange 76 extending into the pocket 70. The seal member 72 includes a lip 78 for gripping the flange 76 for retaining the seal member 72 within the pocket 70.

A screen door 80 may be pivotally connected about the pin 30 for swinging movement when the door 16 is opened.

In operation, the door 16 is shown in the closed position in FIGS. 1 through 8. The door latch mechanism 18 prevents movement about either pivot axis defined by pins 30, 34. The latch member 48 is in the locked condition securing the second support bracket 32 to the second leg 42 of the bracket member 20 and the door 16 itself is locked to the body 12 of the vehicle 10. When the door latch mechanism 18 is unlatched, the door 16 is opened as the bracket member 22 pivots about the pin member 30. As the door 16 releases from the seal member 72, the door swings as the bracket member 22 extends through the opening 36 in the door frame 14. As the shoulder 66 of the detent member 64 engages the pin 62, the door 16 is restrained in the open position 90° pivoted relative to the first support member 28. The door 16 is shown in this open position in FIGS. 9 and 10. To completely open the door 16, the latch member 48 is moved to the unlocked condition by releasing the notch 56 from engagement with the second leg 42 of the bracket member 22 thereby allowing further pivoting movement of the door 16 about the second pin 34. The door 16 is stopped by engagement of the stop plate 68 against the second support bracket 32 as shown in FIGS. 11 and 13. The extending intermediate portion 44 of the bracket member 22 combined with the vertical spacing of the two bracket members 22 supporting the door 16 provides clearance of the door from the door frame 14 and body 12 of the vehicle, thereby allowing the pivoting movement of the curved door so that the door 16 does not engage the door frame 14. In other words, the intermediate portion 44 of the bracket member 22 allows sufficient clearance of the door 16 from the door frame 14 so as to allow continued pivoting movement of the door 16 90° relative to the bracket member 22, thereby effectively swinging the door 180° relative to the door frame 14. Further, the combination of the two hinges 20 spaced vertically from each other places the pivot axis of the two pins 30, 34 within the vehicle 10. In this manner, the hinge means of the instant invention provides a hidden hinge disposed entirely within the door frame 14 and door 16 having a releasable locking mechanism for opening the door either 90° or 180° relative to the door frame 14 and, further, providing hinging means 20 which effectively opens a curved door 180° relative to a curved door frame.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A vehicle comprising: a door (16); a door frame (14); and hinge means (20) for connecting said door (16) to said door frame (14) for allowing pivotal movement of said door (16) from a closed position aligned with said door frame (14) to a 90° open position to a 180° open position; said hinge means (20) including a bracket member (22) having first and second ends (24,26); first pivotal connecting means (30) for pivotally connecting said first end (24) to said door frame (14); second pivotal connecting means (34) for pivotally connecting said second end (26) to said door (16); and characterized by said first and second pivotal connecting means (30,34) lying in a plane substantially parallel to an exterior face of said door (16) when said door (16) is in the closed position and hinge latching means (48) for engaging one of said first and second ends (24,26) of said bracket member (22) in a locked condition to prevent pivotal movement of said bracket member (22) relative to the respective one of said door (16) and said door frame (14) as said door (16) pivots from the closed position to the 90° open position and for releasably disengaging said one of said first and second ends (24,26) in an unlocked condition to allow pivotal movement of said bracket member (22) relative to the respective one of said door (16) and said door frame (14) as said door (16) pivots to the 180° open position.

2. A vehicle as set forth in claim 1 further characterized by door latch means (18) for releasably latching said door (16) to said door frame (14) and preventing pivoting movement of said bracket member (22) and said door (16) about either of said first and second pivotal connecting means (30, 34).

3. A vehicle as set forth in claim 2 further characterized by said hinge means (20) including first support means (28) for operatively connecting said first end (24) of said bracket member (22) to said door frame (14), said first pivotal connecting means pivotally connecting said first support means (28) to said first end (24), said hinge means (20) further including second support means (32) for operatively connecting said second end (26) of said bracket member (22) to said door frame (14), said second pivotal connecting means (34) pivotally connecting said second end (26) to said second support means (32).

4. A vehicle as set forth in claim 3 further characterized by said first support means (28) being mounted within said door frame (14) and said second support means (32) being mounted within said door (16).

5. A vehicle as set forth in claim 4 further characterized by said door frame (14) including an opening (36) within said vehicle (10) and said door (16) including an opening (38) within said vehicle (10), said bracket member (22) being substantially C-shaped and including a first leg (40) extendable through said opening (36) in said door frame (14) and a second leg (42) extendable through said opening (38) in said door (16) and an intermediate portion (44) extending between said first and second leg portions (44, 42).

6. A vehicle as set forth in claim 5 further characterized by said bracket member (22) including an outwardly curved portion (46) extendable outwardly with respect to said door frame (14) and adjacent said first leg (40).

7. A vehicle as set forth in claim 5 wherein said door (16) and door frame (14) are outwardly curved from the vehicle (10), said hinge means (20) including two vertically spaced ones of said bracket members (22).

8. A vehicle as set forth in claim 4 further characterized by said hinge latching means (48) including a latch member (48) mounted on said second support means (32) having a locked condition wherein said latch member (48) engages said second end (26) to prevent pivoting movement of said bracket member (22) relative to said second support means (32) and an unlocked condition wherein said latch member (48) disengages said second end (26).

9. A vehicle as set forth in claim 7 further characterized by said hinge latching means (48) including biasing means for biasing said latch member (22) toward sadi locked condition.

10. A vehicle as set forth in claim 9 further characterized by each of said first and second ends (24, 26) of said bracket member (22) being disposed about said pin members (30, 34) in sliding pivotal engagement therewith.

11. A vehicle as set forth in claim 10 further characterized by including 90° pivot restraining means for restraining pivoting movement of said bracket member (22) at 90° about a first pivot axis relative to said first support means (28).

12. A vehicle as set forth in claim 11 further characterized by said 90° pivot restraining means including a check pin (62) mounted on said first support means (28) in spaced parallel relationship to a first pin member (30) defining said first pivot axis (30), said 90° pivot restraining means further including a detent (64) mounted on said first end (24) of said bracket member (22), said detent (66) including a shoulder (66) which engages said check pin (62) when said bracket member (22) pivots 90° about said first pin member (20) relative to said first support means (28).

13. A vehicle as set forth in claim 12 further characterized by including 90° pivot stop means for stopping pivot movement of said bracket member (22) at 90° about said first pivot axis relative to said first support means (28).

14. A vehicle as set forth in claim 13 further characterized by said first pivot stop means including an extended end portion (65) of said first support means (28) which abuts against said first leg (40) of said bracket member (22) when said bracket member (22) is pivoted 90° relative to said first support means (28).

15. A vehicle as set forth in claim 12 further characterized by including 180° pivot stop means for stopping pivoting movement of said second support means (32) about said second pivot axis relative to said bracket member (22) at 90° of movement of said second support means (32) from said bracket member (22).

16. A vehicle as set forth in claim 4 further characterized by said door (16) and door frame (14) including a first housing (14) for enclosing said first support means and first end (24) of said bracket member (22) and a second housing (16) for enclosing said second support means (32) and second end (26) of said bracket member (22) and seal means for perfecting a seal therebetween.

17. A vehicle as set forth in claim 16 further characterized by said first and second housings (14, 16) including a pocket (70) therebetween, said seal means being disposed within said pocket (70).

18. A vehicle as set forth in claim 17 further characterized by said door frame (16) including a flange extending into said pocket, said seal means including a lip for gripping said flange and retaining said seal means within said pocket.

19. A door hinge (20) comprising: a bracket member (22) having first and second ends (24,26); first support means (28) for supporting said first end (24) from a door frame (14), said first support means (28) including first connecting means (30) for connecting said first end (24) for pivoting movement relative to said first support means (28); second support means (32) for supporting said second end (26) from a door (16), said second support means (32) including second connecting means (34) for connecting said second end (26) for pivoting movement relative to said second support means (32); hinge latching means (48) for releasably latching one of said first and second ends (24,26) of said bracket member (22) from pivoting movement relative to the respective one of said first and second support means (28,32), said hinge latching means (48) characterized by including a latch member (48) mounted on said second support means (32) having a locked condition wherein said latch member (48) engages said second end (26) to prevent pivoting movement of said bracket member (22) relative to said second support means (32) and an unlocked condition wherein said latch member (48) disengages said second end (26), said latch member (48) being mounted on said second support means (32) for pivoting movement relative thereto, said latch member (48) including a leg portion (54) having a notch (56) therein and pivoting to engage said notch (56) on said second end (26) in the locked condition and to release said notch (56) from said second end (26) in said unlocked condition, said latch member (48) having a further locked condition wherein a boundary of the leg portion (54) engages said second end (26).

20. A door hinge as set forth in claim 19 further characterized by said latch member (48) being L-shaped and having said leg portion (54) at one end of said L-shaped member (48) and a handle (58) at the other end thereof.

21. A door hinge as set forth in claim 19 further characterized by said latching means including biasing means for biasing said latch member (22) toward said locked condition.

22. A door hinge as set forth in claim 19 further characterized by said connecting means including first and second pin members (30, 34) mounted on said first and second support means (28, 32), respectively, and defining first and second pivot axes, said first and second ends (24, 26) of said bracket member (22) being mounted on said first and second pin members (30, 34) for pivoting movement about said first and second axis, respectively.

23. A door hinge as set forth in claim 22 further characterized by each of said first and second ends (24, 26) of said bracket member (22) being disposed about said pin members (30, 34) in sliding pivotal engagement therewith.

24. A door hinge as set forth in claim 23 further characterized by including 90° pivot restraining means for restraining pivoting movement of said bracket member (22) at 90° about said first pivot axis relative to said first support means (28).

25. A door hinge as set forth in claim 24 further characterized by said 90° pivot restraint means including a check pin (62) mounted on said first support means (28) in spaced parallel relationship to said first pin member (30), said 90° pivot restraint means further including a detent (64) mounted on said first end (24) of said bracket member (22), said detent (66) including a shoulder (66) which engages said check pin (62) when said bracket member (22) pivots 90° about said first pin member (30) relative to said first support means (28).

26. A door hinge as set forth in claim 25 further characterized by including 90° pivot stop means for stopping pivoting movement of said bracket member (22) at 90° about said first pivot axis relative to said first support means (28).

27. A door hinge as set forth in claim 26 further characterized by said first pivot stop means including an extended end portion (65) of said first support means (28) which abuts against said first leg (40) of said bracket member (22) when said bracket member (22) is pivoted 90° relative to said first support means (28).

28. A door hinge as set forth in claim 24 further characterized by including 180° pivot stop means for stopping pivoting movement of said second support means (32) about said second pivot axis relative to said bracket member (22) at 90° of movement of said second support means (32) from said bracket member (22).

29. A door hinge as set forth in claim 28 further characterized by said 180° pivot stop means including a stop plate (68) extending from said second end (26) of said bracket member (22) adjacent said second pivot axis (34) which engages said second support means (32) when said second support means (32) pivot 90° relative to said bracket member (22).

30. A door hinge as set forth in claim 20 further characterized by said bracket member (22) including C-shaped portions at said first and second ends (24, 26) thereof.

31. A door hinge as set forth in claim 19 including a first housing (14) for enclosing said first support means and first end (26) of said bracket member (22) and a second housing (16) for enclosing said second support means (32) and second end (26) of said bracket member (22) and seal means for perfecting a seal therebetween.

32. A door hinge as set forth in claim 31 further characterized by said first and second housings (14, 16) including a pocket (70) therebetween, said seal means being disposed within said pocket (70).

33. A door hinge as set forth in claim 32 further characterized by said seal means comprising essentially a flexible tubular member (72) having a hollow longitudinal center portion (74).

34. A door hinge as set forth in claim 32 further characterized by said first housing (14) including a flange (76) extending into said pocket (70), said seal means (72) including a lip (78) for gripping said flange (76) and retaining said seal means (72) within said pocket (70).

35. A door hinge as set forth in claim 27 further characterized by including 180° locking means for locking pivoting movement of said second support means (32) about said second pivot axis relative to said bracket member (22) at 90° of movement of said second support means (32) from said bracket member (22).

36. A door hinge as set forth in claim 35 further characterized by said 180° locking means including an end portion of said latch member (48), said biasing means downwardly biasing said end portion to abut against said second end (26) of said bracket member (22) when said second support means (32) is pivoted 90° about said second pivot axis.

37. A vehicle comprising; a door (16), a door frame (14), a bracket member (22) having first and second ends (24, 26), first support means (28) for supporting said first end (24) from said door frame (14), second support means (32) for supporting said second end (26) from said door (16), first and second pin members (30, 34) mounted on said first and second support means (28, 32), respectively, and defining a first and second pivot axis, said first and second ends (24, 26) of said bracket member (22) being mounted on said first and second pin members (30, 34) for pivoting movement about said first and second axes, respectively, a latch member (48) mounted on said second support means (32) for pivoting movement relative thereto, said latch member (48) being L-shaped and including a leg portion (54) having a notch (56) therein and pivoting to engage said notch (56) on said second end (26) in a locked condition wherein said second support means (32) is in a first position and to release said notch (56) from said second end (26) in an unlocked condition, 180° locking means for locking pivotal movement of said second support means (32) about said second pivot axis relative to said bracket member (22) at 90° of movement of said second support means (32) from said first position and including an end boundary of said leg portion (54) spaced from said notch (56), a biasing means downwardly biasing said end boundary to abut against said second end (26) of said bracket member (22) when said second support means (32) is pivoted 90° about said second pivot axis.

38. A door hinge (20) comprising; a bracket member (22) having first and second ends (24, 26), first support means (28) for supporting said first end (24) from a door frame (14), second support means (32) for supporting said second end (26) from a door (16), first and second pin members (30, 34) mounted on said first and second support means (28, 32), respectively, and defining a first and second pivot axis, said first and second ends (24, 26) of said bracket member (22) being mounted on said first and second pin members (30, 34) for pivoting movement about said first and second axes, respectively, said bracket member (22) including C-shaped portions at said first and second ends (24, 26) thereof, a latch member (48) mounted on said second support means (32) for pivoting movement relative thereto, said latch member (48) being L-shaped and including a leg portion (54) having a notch (56) therein and pivoting to engage said notch (56) on said second end (26) in a locked condition wherein said second support means (32) is in a first position and to release said notch (56) from said second end (26) in said unlocked condition, 180° locking means for locking pivotal movement of said second support means (32) about said second pivot axis relative to said bracket member (22) at 90° of movement of said second support means (32) from said first position and including an end boundary of said leg portion (54) spaced from said notch (56), a biasing means downwardly biasing said end boundary to abut against said second end (26) of said bracket member (22) when said second support means (32) is pivoted 90° about said second pivot axis.

* * * * *